US011989716B2

(12) United States Patent
Grechenig (10) Patent No.: US 11,989,716 B2
(45) Date of Patent: May 21, 2024

(54) SYSTEM FOR PROCESSING REQUESTS FROM MOBILE DEVICES

(71) Applicant: RESEARCH INDUSTRIAL SYSTEMS ENGINEERING (RISE), Schwechat (AT)

(72) Inventor: Thomas Grechenig, Vienna (AT)

(73) Assignee: RESEARCH INDUSTRIAL SYSTEMS ENGINEERING (RISE), Schwechat (AT)

( * ) Notice: Subject to any disclaimer, the term of this patent is extended or adjusted under 35 U.S.C. 154(b) by 0 days.

(21) Appl. No.: 17/251,402

(22) PCT Filed: Aug. 14, 2019

(86) PCT No.: PCT/AT2019/060260
§ 371 (c)(1),
(2) Date: Dec. 11, 2020

(87) PCT Pub. No.: WO2020/037344
PCT Pub. Date: Feb. 27, 2020

(65) Prior Publication Data
US 2021/0248582 A1 Aug. 12, 2021

(30) Foreign Application Priority Data
Aug. 24, 2018 (AT) .............. A 50728/2018

(51) Int. Cl.
*G06Q 20/32* (2012.01)
*G06K 7/10* (2006.01)
(Continued)

(52) U.S. Cl.
CPC ....... *G06Q 20/322* (2013.01); *G06K 7/10297* (2013.01); *G06Q 20/204* (2013.01);
(Continued)

(58) Field of Classification Search
CPC ............ G06Q 20/322; G06Q 20/204; G06Q 20/3278; G06K 7/10297; G07C 9/00; H04W 8/22
(Continued)

(56) References Cited

U.S. PATENT DOCUMENTS

2008/0144880 A1* 6/2008 DeLuca ................. G06T 7/20
382/100
2019/0114606 A1* 4/2019 Nuzum ................ G06Q 20/206

FOREIGN PATENT DOCUMENTS

DE 102012108117 2/2014
DE 102012108117 A1 * 2/2014 .......... G06F 11/2038
(Continued)

OTHER PUBLICATIONS

Intelex Technologies Announces Industry-Changing Mobile Platform at National Safety Council Congress and Expo ICT Monitor Worldwide; Amman [Amman]. Oct. 18, 2016. (Year: 2016).*
(Continued)

*Primary Examiner* — Florian M Zeender
*Assistant Examiner* — Fawaad Haider
(74) *Attorney, Agent, or Firm* — Workman Nydegger (57) ABSTRACT

A system for processing a request of a mobile device, and there is provided an information collection device, which is configured to associate the information received from processing devices or from the mobile device of the system with respective requests of the mobile devices in order to determine the current status information of each request of each mobile device, for which purpose there is carried out, in the case of the absence of request identification information required for a clear association and/or identity identification information, a first association by way of further pieces of information contained in the request information, and that the information collection device is configured to transmit
(Continued)

the current status information of the respective request to the respective mobile device.

5 Claims, 3 Drawing Sheets

(51) Int. Cl.
    *G06Q 10/02*     (2012.01)
    *G06Q 20/20*     (2012.01)
    *G07C 9/00*     (2020.01)
    *H04W 8/22*     (2009.01)

(52) U.S. Cl.
    CPC ........... *G06Q 20/3278* (2013.01); *G07C 9/00* (2013.01); *H04W 8/22* (2013.01); *G06Q 10/02* (2013.01)

(58) Field of Classification Search
    USPC .......................................................... 705/17
    See application file for complete search history.

(56) References Cited

FOREIGN PATENT DOCUMENTS

| | | | |
|---|---|---|---|
| DE | 102013017100 | 4/2015 | |
| DE | 102013017100 A1 * | 4/2015 | ............. H04L 51/20 |
| WO | 2017072067 | 5/2017 | |
| WO | WO-2017072067 A1 * | 5/2017 | ............. G06Q 20/02 |

OTHER PUBLICATIONS

Guan, Jianfeng; Liu, Xuan; Yao, Su; Jiang, Zhongbai. Design and Implementation of a Central-Controllable and Secure Multicast System Based on Universal Identifier Network. Sensors; Basel vol. 18, Iss. 7, (2018): 2135. (Year: 2018).*
Ning, Ke. System-level memory power and performance optimization for system-on-a-chip embedded systems. Northeastern University ProQuest Dissertations Publishing, 2008. (Year: 2008).*
International Search Report issued in Application No. PCT/AT2019/060260 dated Oct. 1, 2019.
International Preliminary Report on Patentability issued in Application No. PCT/AT2019/060260 dated Sep. 21, 2020.

* cited by examiner

SYSTEM FOR PROCESSING REQUESTS FROM MOBILE DEVICES

The present application is a U.S. National Stage of International Application No. PCT/AT2019/060260, filed on Aug. 14, 2019, designating the United States and claiming the priority of Austrian Patent Application No. A50728/2018 filed with the Austrian Patent Office on Aug. 24, 2018. All of the aforementioned applications are incorporated herein in their respective entireties by this reference.

The invention relates to a system for processing at least one request of at least one mobile device using at least one first processing device and a final processing device of the system according to the preamble of the claim 1.

Those skilled in the art know systems, wherein request information of a mobile device such as, e.g., a mobile phone, is processed by one or several processing devices in order to finally send a response information to the mobile phone. The processing devices may carry out their part of the processing of the request in a time-delayed manner and provide for partial results or partial responses, respectively, of the respectively successive processing device as an input value for the processing thereof or transmit already to predecessor processing devices or the mobile phone. The status of the processing of the request and the response to the request may vary, hence, depending on the partial response, and there is enormous interest to provide in the mobile phone respectively the current status of the request and/or already a possibly correct response to the request for the user of the mobile phone.

Such a request may, for example, relate to the issue whether the user of the mobile phone may enter or use a particular room of a building complex, this, for example, is a clean room of a laboratory, with particular materials he/she is taking along. This request has to be examined, for example, by various processing devices as regards content. In this way, an upstream security installation may examine the request in terms of plausibility and correct encryption, a building administration server may examine the request in terms of the feasibility thereof, as the clean room could be currently locked for cleaning or booked by another user, and an isolated security server may examine the request for access authorisation of the requesting person for the clean room or the level of security clearance thereof. It is of advantage if the current status regarding the request, this is the status and the probable response to the request, can be displayed in the mobile phone on a display of the mobile phone.

With known system, however, it has proven to be disadvantageous that partial responses of processing devices cannot always be associated with the related requests of the related mobile phones, which is why the information to the request, which is displayed on the display of the mobile phone, was not updated or even false. Furthermore, there are examples of applications in prior art, wherein the requests are issued by the mobile phone via a local data transmitting channel such as a Bluetooth or RFID radio connection to a first processing device. As soon as the mobile phone has been removed from the reception range of the local data transmitting channel, with many such systems it will no longer be possible to transmit responses or the updated status information from one or all processing devices of the system to the mobile phone, which is why the mobile phone cannot display any current information regarding the request.

With other known system it has proven to be disadvantageous that the association of the results of the individual processing devices, this is the association of the partial responses to the requests, with the request and the requesting mobile phone has not always been possible. Due to the lacking association, the partial response could not be taken into consideration for the determination of the final response to the request, which has led to faulty responses or faulty status information.

It is the task of the present invention to provide a system in order to enable the display of the best possible and current information on the status and the response to the request using the mobile device.

According to the invention the present task is solved by a system having an information collection device with the features of the characterizing part of the claim 1 and a method according to claim 7. Preferred embodiments of the invention are subject of the dependent claims.

The processing devices of the system according to the invention, this is the first processing device, optionally further processing devices and the final processing device, transmit the results of their processing as partial responses directly or indirectly to the information collection device, which associates the partial responses with the different requests of the mobile devices in the system. As every new request is characterized by a request identification information and every user of the system and/or his/her mobile device is characterized by an identity identification information, at least one of these identification information or both of these identification information may be used by the information collection device for the secure association of the information or the partial responses, respectively, received by the processing devices if this identification information is co-transmitted within the frame of the partial response. After the association of the partial response to the request of the mobile phone, the information collection device updates the status of the processing of the request and/or the probable or final response to the request. The thus updated status information and the probable or final response are then transmitted by the information collection device to the mobile device, whereby the user of the mobile device may have displayed current information regarding his/her request at any point of time on the display of the mobile device.

The information collection device according to the invention is now configured to carry out, in the case of the absence of an identification information required for a clear association of the partial response, a best possible association by way of the further information contained in the request information and the partial response. Identification information may lack for the most diverse reasons in the partial response, depending on the application. For example, a transmittance failure in the information from the procession device to the information collection device may lead to the failure, or the identification information cannot be co-processed and transmitted for data protection reasons. It would also be possible that individual processing devices are not configured to process the identification information, as, for example, the outdated application software of the building administration server is not able to process this identification information. Advantageously, the best possible association of partial responses to requests of mobile devices, which is based according to the invention on all present pieces of information, may enable a marked improvement of the quality and reliability of the status information and response information that may be displayed with the mobile device.

A best possible or also first association is, according to the invention, carried out always then when there is not available a clear association by way of the request identification information characterizing the request or an identity identification information clearly identifying the user of the system or his/her mobile device of the information collection device. The best possible or first association at a particular point of time is a possibly exact association by means of one or several bits of information or parameters, respectively, received by the information collection device, which on its own do not enable a clear association but, using an association or matching algorithm, enable at this particular point of time using the present information a first or best possible association. If, at a later point of time, the request identification information characterizing the request or the identity identification information clearly identifying the user of the system or his/her mobile device are available, then the best possible or first association realized in advance will be replaced or confirmed by the clear association.

The technical effect obtained by the technical measures of the information collection device according to the invention is, depending on the exemplary embodiment, a higher reliability or quality, respectively, of the status information and of the response to the request by the mobile device. This will be further discussed in greater detail by way of the exemplary embodiments given in the figures and the figure description.

Figure 1:
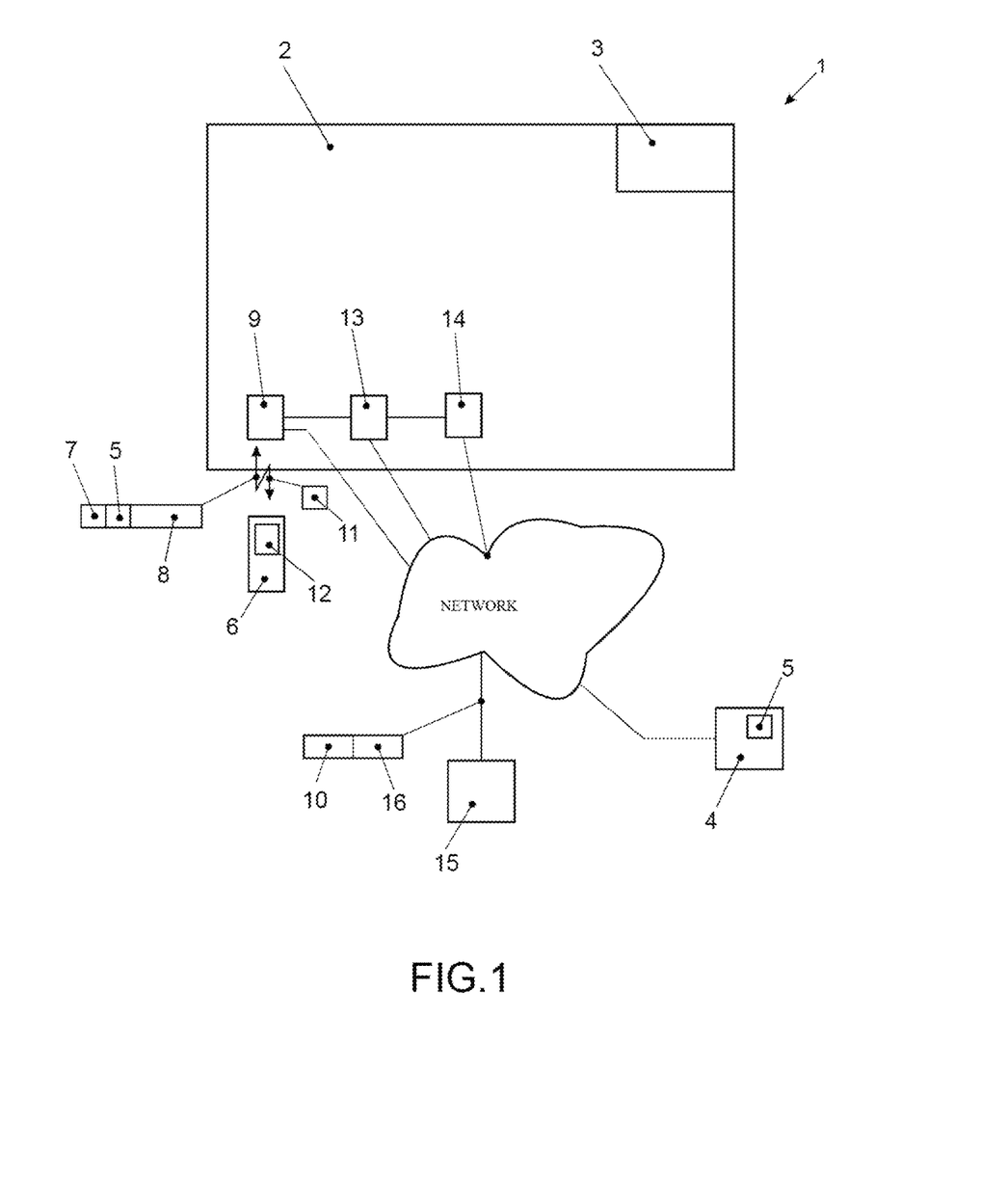
FIG. 1 shows an access control system for a laboratory according to a first exemplary embodiment of the invention.

FIG. 1 shows an access control system 1 for a research institute 2 for dangerous viruses of the highest security level having a specialized laboratory room 3 and various other rooms according to a first exemplary embodiment of the invention. The access control system 1 enables users of the access control system 1 to book and enter the specialized laboratory room 3 and other specialized rooms for particular tests. For each user of the access control system 1 there are stored in a secured decentralized identification server 4, which constitutes a final processing device, identity identification information 5 identifying the user by his/her name, his/her passport number and his/her fingerprint. The user may identify himself/herself in the access control system 1 using his/her mobile device, this is his/her mobile phone 6, which is why there is stored in the identification server 4 as identity identification information 5 further a unique serial number of a secure element present in the mobile phone 6.

The mobile phone 6 is configured to process a request application, by means of which request information 8 characterized by a request identification information 7 may be output to an RFID reader 9 within the reception range of the research institute 2. The RFID reader 9 hereby constitutes a first processing device and may be constituted by a commercially available contactless reader, which communicates with the mobile phone 6, for example, according to the NFC standard. The mobile phone 6 may be held into the immediate vicinity of the RFID reader 9 in order to output the request whether the laboratory room 3 may be booked and whether the access authorisation may be issued.

As request information 8, there may, for example, be transmitted the request if Mr Franz Müller may use on the $20^{th}$ of August, 2018, from 13.00 to 19.00 the laboratory room 3 for the analysis of poxviruses contained in a special container. This request information 9 entered manually by Mr Müller using the mobile phone 6 is then transmitted by the mobile phone 6, together with the identity identification information 5 of the mobile phone 6. The RFID-Reader 9 checks in a pre-processing of the request whether the transmitted request information 8 and identity identification information 5 have a plausible data structure and have been transmitted according to the encryption provided for such requests. If this is the case, then the RFID reader 9, as a conformation, sends back to the mobile phone 6 the request identification information 7 that is unique in the access control system 1 for the request, wherein the request identification information 7 may be constituted by a serial number for each request of the mobile phone 6 in the access control system 1, linked to the identity identification information 5. The RFID-Reader 9 further transmits a status information 11, which may displayed on a display 12 of the mobile phone 6, that the request has been accepted for further processing. After Mr. Müller has received this status information 11, he may leave the research institute 2, as the processing of his request may last several minutes but also some hours, as, for example, a manual authorisation by the supervisory staff is required.

The access control system 1 further has a building administration server 13, which constitutes a second processing device and in which the information relating to every room in the research institute 2 is stored. On the one hand side, there is stored in regard to every room when and until when it has been booked by whom, there are, however, also stored facilities available in the room as well as restrictions valid for the room, which group of persons of which security level may use the room. In the building administration server 13 the request by Mr Müller is examined, and it is determined that the laboratory room 3 may be used at the desired point of time.

The access control system 1 further has a hazard server 14, which constitutes a third processing device and which examines whether the poxviruses indicated in the request information 8 may be taken into the research institute 2 and whether the laboratory room 3 is authorised for tests with the poxviruses.

In the secured decentralized identification server 4, there is further checked whether the identity identification information 5 of the mobile phone 6 of Mr Müller is stored and whether Mr Müller has been allocated the security level, which may do research on poxviruses.

The access control system 1 now has a response server 15 constituting an information collection device, which is configured to associate the information by from the RFID reader 9, the building administration server 13, the hazard server 14 and the identification sever 4 or by the mobile phone 6 of the access control system 1 with the respective requests of the mobile phones 6 in order to determine the current status information of each request of each mobile phone 6. Therefore, the response server 15 checks the information received from the processing devices whether this is characterized in a partial area by the identity identification information 5 of a mobile phone 6 and/or a known request identification information 7 of the access control system 1. If that is the case, then a clear association of the information received by the respective processing device with a concrete request of a mobile phone 6 is possible. The information associated with a particular request may thus be used for changing the status information of the request and for concretising the response. If, for example, the check of the hazard server 14 shows that poxviruses must not be used in the research institute 2, then there may be generated a status information 10 "request processing completed" and a response information 16 for Mr. Müller as "access denied, due to materials not approved". This status information 10 and response information 16 may be transmitted by the response server 15 via the normal phone network or the internet NET as data to the request application of the mobile phone 6 and stored there. In this way, there is obtained the advantage that Mr. Müller receives immediately after completion of the check of his request the current status information 10 and the response information 16 displayed on the display 12 of the mobile phone 6.

Figure 2:
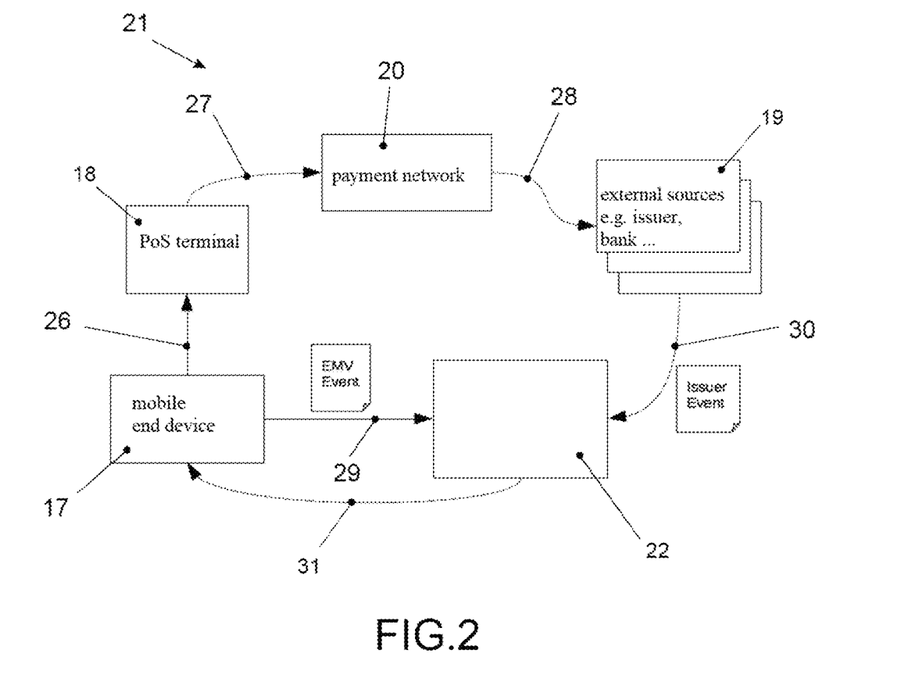
FIG. 2 shows a further exemplary embodiment of the invention, wherein a product may be paid for using a mobile end device at a point-of-sale terminal according to the European payment system EMV.

The building administration server 13 is now adapted to respond to requests regarding particular rooms with an information whether, for example, the laboratory room 3 is available and may be booked for the desired point of time, but this information does not contain a partial area having an identity identification information 5 and/or a request identification information 7, which is why an immediate and clear association of the information received from the response server 15 with a request is not possible with the access control system 1. In order to solve this technical problem, the response server 15 is configured to carry out a best possible association by way of the further information contained in the request information 8. According to the preceding example, the request information 8 of Mr. Müller contains the request whether the laboratory room 3 may be booked on the $20^{th}$ of August, 2018, from 13.00 to 19.00, wherein the information transmitted from the building administration server 13 to the response server 15 only contains the information "Laboratory room 3 was booked on the $20^{th}$ of August, 2018, from 13.00 to 19.00 for you". As no other request currently being processed in the access control system 1 or still being valid relates to the time period from 13.00 to 19.00 on the $20^{th}$ of August, 2018, the response server 15 may then assume with the utmost probability that the performed booking is for Mr. Müller's request, thus being able to update the status information and the probable response to the request in the response server 15. In this way, there is obtained the advantage that there is especially high reliability of the access control system 1 even if individual devices of the processing devices of the access control system 1 only supply faulty information. There may, consequently, be determined that only persons with authorised access to the respective rooms are admitted and that there will be immediately issued information regarding their access authorisation.

The response server 15 is further configured to continuously process the information received by the processing devices 4, 9, 13 and 14 or via the mobile phone 6 in a time-delayed and parallel way in order to keep the determined current status information 10 and response information 16 update in regard to the actual processing status of the processing of the request information 8 in the processing devices 4, 9, 13 and 14. This is in particular advantageous as the individual processing devices 4, 9, 13 and 14 provide partial responses at different speeds and partly mutually dependent, which is why only a continuous processing of the information received by the response server 15 will ensure the highest level of up-to-dateness of the status information 10 and of the response information 16.

The response server 15 is further configured to process information received by the RFID reader 9 as information successively to a request in order to draw conclusions on the current status information 10 and response information 16.

The response server 15 is further configured to process the information received from the various processing devices 4, 9, 13 and 14 and the mobile phone 6 in an intra-source manner as respectively various further information sources. The response server 15 is further configured to process the information of the intra-source-processing for the inter-source update of the request status. By way of this mode of operation there is being ensured that the current status information 10 and the current response information 16 may be determined with the highest reliability possible.

FIG. 2 shows a further exemplary embodiment of the invention, wherein using a mobile end device 17 a product may be paid for at a point-of-sale or POS terminal 18 according to the European payment system EMV. EMV designates a standard for payment cards having chip technology and the related chip card devices (e.g., POS NFC terminals or cash dispensers). From the end customer's point of view, a common EMV transaction using a physical payment card (e.g., cash card in Austria) runs through the following phases:

EMV start: The customer waits at the point-of-sale terminal 18 and starts an EMV transaction with the point-of-sale terminal 18 in order to buy a product. For this purpose, data are exchanged between the payment card or the mobile end device 17 simulating the function of the payment card, respectively, and the point-of-sale terminal 18.

Authorisation: The point-of-sale terminal 18 decides, optionally with the aid of an issuer 19 or the customer's bank (where the account is lodged), whether the transaction is authorised (e.g., by technical check of the validity of the card and check of the bank balance). Upon the check being accomplished, the transaction is displayed with the check result on the point-of-sale terminal 18. From the customer's point of view, the transaction has been carried out at this point, and a successful notification is being displayed.

Presentment or transaction filing: Subsequently, the transaction is further processed by downstream dealer systems. Using the presentment, the actually paid transaction amount is deduced from the customer's bank account. At this point, the transaction has been completed.

Reversal or cancellation: If there is realized a cancellation upon successful authorisation, but before the presentment, then there will be sent a reversal to the issuer 19 in order to release the amount previously reserved. At this point, the transaction has been completed.

Hence, this results in the following conditions of an EMV transaction:

started: The customer has started the EMV transaction at the point-of-sale terminal 18.

authorised: The authorisation has been confirmed by the issuer 19.

rejected: The authorisation has been rejected by the issuer 19 (e.g., due to insufficient bank balance, card deactivation).

booked: The presentment has been processed by the issuer 19.

cancelled: The reversal has been processed by the issuer 19.

The status transitions between the phases are caused by messages, which the point-of-sale terminal 18 sends to the issuer 19 via a payment network 20. Technically speaking, these messages are called transaction events, which cause a status transition of the total transaction and, hence, update the secured information of the total transaction with the issuer 19.

In the case of contactless NFC-based EMV payment processes at the point-of-sale terminal 18 via the mobile end device 17 (e.g., smartphone, smart watch), the payment application installed at the mobile end device 17 is provided with transaction information on the transaction just carried out (by means of the "EMV event") by the point-of-sale terminal 18. This information is delivered, as soon as the communication between point-of-sale terminal 18 and mobile end device 17 has been completed—but before it has been secured that the transaction has really been realized successfully. Further information such as, e.g., transaction status, amount actually debited (e.g. in the case of transactions in foreign currency), will remain hidden for the end customer, hence, in the payment application at this point of time. This will only be determined later on by the issuer 19 itself and then provided to the customer.

The system 21 according to FIG. 2 for carrying out the transaction now has an information collection device 22 in order to link the transaction information of the EMV information with data from external data sources and in order to enable a comprehensive display of the transaction information on the mobile end device 17 for the end customer. As an external source there may be connected, for example, the issuer 19, which transmits secured information on the status of a transaction further as an "issuer event". The issuer 19 constitutes a final processing device, which, for example, performs the final currency conversion of a foreign currency payment. An amount paid by the mobile end device 19 amounting to 20$ is converted at the issuer 19 to the amount of 17.45€ actually to be debited from the Euro account of the bank according to the daily exchange rate. The information collection device 22 receives this information of the amount to be debited from the issuer 19 and provides it to the mobile end device 17 for display.

A trivial data link, however, is not always possible due to various bits of information from various sources of an existing EMV ecosystem. It may be that due to technical factors it cannot be ensured that all status transitions are transmitted as "issuer event" for a transaction at all or in the correct order.

The following transaction information relevant for the link is present in the existing EMV ecosystem:

Source: EMV Event:
EMV_CARD_NR: An identification number of a payment card or of a secure element, respectively, of the mobile end device 17 that is unique for one issuer 19 and forms an identity identification information.
EMV_ATC: An identification number unique for one transaction (in combination with EMV_CARD_NR) and forms, together with the EMV_CARD_NR, a request identification information.
EMV_DATE_TIME: Transaction date at the site of the transaction being realized and forms a part of the request information.
EMV_BETRAG: The payment amount exchanged between point-of-sale terminal 18 and card or mobile end device 17, respectively, forms a part of the request information.
EMV_WÄHRUNG: The currency of the payment amount exchanged between point-of-sale terminal 18 and card or mobile end device 17, respectively, forms a part of the request information.

The following secured information is provided in relation to the issuer 19:
Source: Issuer Event
I_CARD_NR: An identification number of a payment card or a secure element, respectively, of the mobile end device 17, which is unique for one issuer 18, and forms an identity identification information.
I_ATC: An identification number unique for one transaction (in combination with I_CARD_NR) and forms, together with the I_CARD_NR, a request identification information. This information is optional, and thus it cannot been guaranteed that this is present or correct.
I_EVENT_TYPE: Type of the issuer event (authorisation, reversal, presentment) and forms part of the request information.
I_EVENT_ID: Identification number unique for Event_Type and forms a part of the request identification information.
I_REFERENZ_ID: Reference of presentment to authorisation Event-Id and forms a part of the request identification information. Is only present for a presentment if the related authorisation has been realized online (i.e., through the issuer).
I_BERTAG_AUTORISIERT: Authorised amount in original currency, i.e., in the national currency of the terminal before any rate conversion, and forms a part of the request information. Only available upon authorisation.
I_WÄHRUNG_AUTORISIERT: The currency of the authorised amount and forms a part of the request information. Only available upon authorisation.
I_BETRAG_VERRECHNET: Cleared amount in original currency, i.e. in the national currency of the terminal before any rate conversion, and forms a part of the request information. Only available upon presentment and reversal.
I_WÄHRUNG_VERRECHNET: The currency of the cleared amount and forms a part of the request information. Only available upon presentment and reversal.
I_DATE_TIME: Transaction date and local time at the site of the transaction realization and forms a part of the request information.

Transaction Matching Algorithm:

In order to combine the transaction data from various sources (events) into a total transaction data set and, hence, enable a linking of the transaction data, the events have to be compared to one another and connected to another ("matched"). The aim is, on the one side, to define an intra-source matching (linking and combining events from one source) and, on the other side, determine an inter-source matching (linking and combining of events of various sources) in order to obtain the desired link. The subsequently described technical realisation of this matching in the information collection device 22 enables a failure-tolerant linking of external and internal transaction data for a comprehensive display of the transaction information. Intra-source matching is in the following defined for issuer events and inter-source matching for the linking of EMV events with issuer events.

Mutual Linking of Issuer Events:

In system 21 there is not ensured that issuer events that are further transmitted will be delivered completely and chronologically. This means that it is, for example, possible that a presentment event is delivered before an authorisation event, or an authorisation event is not delivered at all (e.g. if the authorisation is realized offline). Furthermore, different issuer event types contain different types of information. For this reasons, it is thus necessary to combine issuer events, which are related to a total transaction or a request, respectively, in the information collection device 22.

Issuer events may be combined and clearly associated with the aid of the following technical requests:

Authorisation may be clearly linked with presentments via I_REFERENZ_ID=I_EVENT_ID of the authorisation.

Authorisation may be clearly linked with reversals via I_REFERENZ_ID=I_EVENT_ID of the authorisation.

Figure 3:
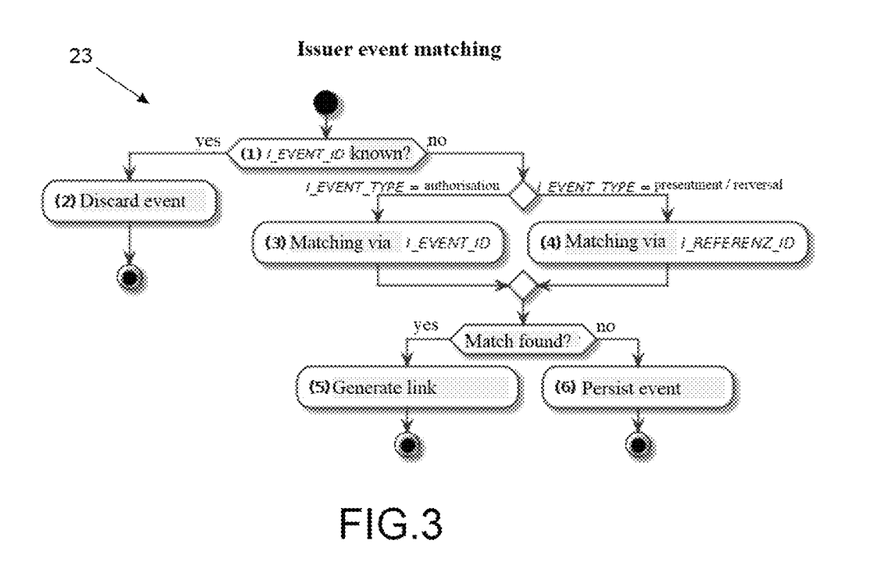
FIG. 3 shows a flow diagram for the clear association of events from an exemplary processing device (issuer events) in the system according to FIG. 2.

FIG. 3 shows a flow diagram 23 for the clear association, which is explained in greater detail in the following table.

TABLE 1

Steps of the Issuer Event Matching

| Step | Description |
|---|---|
| 1. | Checking I_EVENT_ID<br>Is there already an issuer event $I_1$, for which it is true that:<br>I EVENT ID = $I_1$.I EVENT ID |
| 2. | Discarding the event:<br>The event is already known to the system 1 and may be discarded. |
| 3. | Matching via I_EVENT_ID<br>Search in all issuer events of the type presentment or reversal (R) for those, for which it is true that:<br>I_EVENT_ID = PR.I_REFERENZ_ID |
| 4. | Matching via I_REFERENZ_ID<br>Search in all issuer events of the type authorisation (A) for those, for which it is true that:<br>I_REFERENZ_ID = A.I_EVENT_ID |
| 5. | Generating a link<br>This is not the first issuer event of this total transaction. Link the issuer events and combine the data. Then proceed with the standard matching (see table 2). |
| 6. | Persisting the event<br>This is the first issuer event for the total transaction. Store this event and then proceed with the standard matching. |

Linking of EMV Event and Issuer Event:

In the following, there is explained the multi-stage matching between EMV event and issuer event, wherein there is preliminarily attempted with a standard matching to enable a clear association and, if this is not possible, with a best effort matching a best possible association of the information received from the point-of-sale terminal 18 or the issuer 19 or the mobile end device 18 in the information collection device 22 with the respective transactions of the mobile end devices 17 in the system 21.

Standard Matching:

The standard matching presents the norm of matching. In this case, there is possible a 1:1 association of the two events by association of the respective IDs. EMV transactions may be clearly matched with authorisations via EMV_CARD_NR=I_CARD_NR and

EMV_ATC=I_ATC, if the I_ATC is available. If there is found a match in this manner, this will be considered as reliable. Any possible links of the events, which have been generated by a preceding event via the best effort matching (see table 3), may be considered as faulty and may be corrected.

Figure 4:
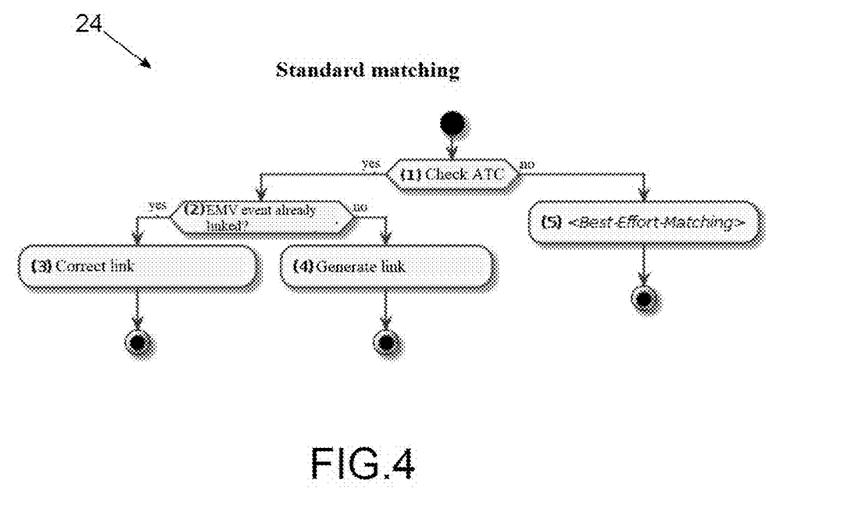
FIG. 4 shows a flow diagram relating to the standard matching in the system according to FIG. 2.

FIG. 4 shows a flow diagram 24 relating to the standard matching in the form of a sequence diagram in UML notation. A description of the algorithm may be found in the following table 2.

TABLE 2

Steps of the Standard Matching

| Steps | Description |
|---|---|
| 1. | Checking I_ATC<br>If the field I_ATC is set and if there exists an EMV event, for which it is true that:<br>EMV_CARD_NR = I_CARD_NR and<br>EMV_ATC = I_ATC |
| 2. | Link available<br>Checking whether the EMV event found has already been linked to an issuer event. |
| 3. | Correcting link<br>The existing link of the EMV event found was generated by way of best effort matching and is faulty. The standard matching has found a reliable match, by means of which the link may be corrected.<br>The EMV event found is linked to the new issuer event. |
| 4. | Generating link<br>Link the selected EMV event with the issuer event |
| 5. | Best effort matching<br>Standard matching cannot be carried out. Start best effort matching. |

Best Effort Matching:

The information collection device 22 according to the invention is now configured, if it is not possible to clearly associate an EMV event with an issuer event, to carry out a tolerant best effort matching for the best possible association. Therein, the following fields will be compared in several technical requests according to a flow diagram 25 in FIG. 5:

EMV_CARD_NR=I_CARD_NR and

EMV_DATE_TIME=I_DATE_TIME and

Figure 5:
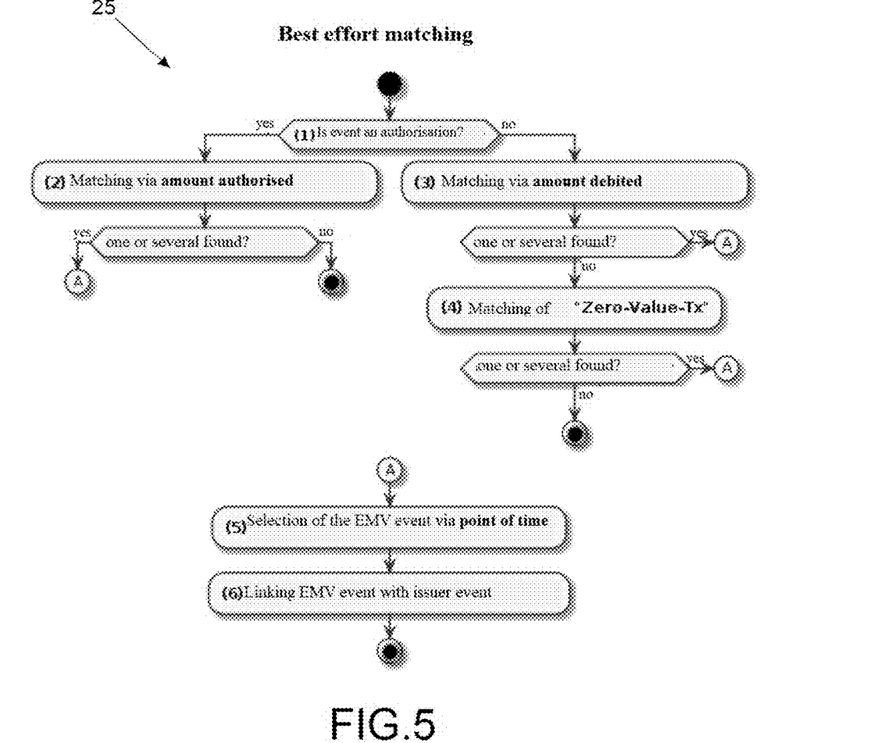
FIG. 5 shows a flow diagram relating to the best effort matching in the system according to FIG. 2, in the case that the standard matching does not provide a result.

EMV_BETRAG=I_BERTAG_AUTORISIERT (in the case of authorisations) or I_BETRAG_VERRECH-NET, respectively (in the case of presentments, reversals) and EMV_WÄHRUNG=I_WÄHRUNG_AUTORISIERT (in the case of authorisations) or I_WÄHRUNG_VER-RECHNET, respectively (in the case of presentments, reversals)

The preceding information compared in the course of the best effort matching is further information contained in the request information and/or generated in the course of the processing of the request information relating to this transaction, which enable an association of an EMV event with an issuer event with high or highest possible, respectively, probability. As the respective data or information, respectively, cannot always be transmitted in a reliable way, there may be developed faulty links. These are, however, corrected in the course of standard matching (as previously described).

The flow diagram 25 depicted in FIG. 5 relating to the best effort matching is depicted in the course of a sequence diagram in UML notation. A description of the flow diagram 25 may be found in the following table 3.

TABLE 3

Steps of the best effort matching

| Step | Description |
|---|---|
| 1. | Event selection<br>Checking whether the issuer event is of the type authorisation (I EVENT TYPE = AUTH) |

TABLE 3-continued

Steps of the best effort matching

| Step | Description |
|---|---|
| 2. | Matching through amount for the authorisation event<br>Searching in all EMV events not already linked for those, for which it is true that:<br>EMV_CARD_NR = I_CARD_NR and<br>EMV_BETRAG = I_BERTAG_AUTORISIERT and<br>EMV_WÄHRUNG = I_WÄHRUNG_AUTORISIERT<br>If there is not found an appropriate event, there cannot be generated a link.<br>The process ends, the event, however, is being stored. |
| 3. | Matching through amount for the presentment or reversal event<br>Searching in all EMV events not already linked for those, for which it is true that:<br>EMV_CARD_NR = I_CARD_NR and<br>EMV_BETRAG = I_BERTAG_VERRECHNET and<br>EMV_WÄHRUNG = I_WÄHRUNG_VERRECHNET |
| 4. | Matching of "zero-value-transactions" for the presentment or reversal event<br>Searching in all EMV events not already linked for those, for which it is true that:<br>EMV_CARD_NR = I_CARD_NR and<br>Day from EMV_DATE_TIME = day from I_DATE_TIME and<br>EMV BETRAG = 0 |
| 5. | Selection of the Event<br>From all EMV events found, select that event, the time of which from EMV DATE TIME is closest to the time from I DATE TIME |
| 6. | Linking<br>Link the selected EMV event with the issuer event |

Integration into the EMV Ecosystem:

In the following, there is explained the method for processing the request for payment of a product by way of the system 21 depicted in FIG. 2, how the system 21 uses the information collection device 22 in the course of the payment process in the EMV ecosystem.

Step 26: The customer (not included in the diagram) starts via his/her mobile end device 17 a contactless payment transaction, wherein the mobile end device 17 exchanges data relevant for the payment process or request information and request identification information, respectively, with the point-of-sale terminal 18.

Step 27: The point-of-sale terminal 18 communicates with the payment network 20.

Step 28: The payment network 20 transmits the payment data further to an external source (e.g., issuer 19, bank), which checks the validity of the payment card, the sufficient account balance, the creditability of the payer, etc., and, if all prerequisites are fulfilled, authorises the payment and deals with the further steps (presentment or reversal in the case of a negative authorisation).

Step 29: Temporarily in parallel to the steps 26 to 28, the mobile end device 18 transmits the EMV payment data ("EMV events") received from the point-of-sale terminal 18 to the information collection device 22.

Step 30: The issuer transmits the information on status changes including data updates of the transaction ("issuer events") to the information collection device 22.

Step 31: If an event arrives, the information collection device 22 associates, according to the matching indicated in the FIGS. 3 to 5 of the respective transaction of the respective mobile end device 17, clearly and in a best possible manner. If there are made any changes to the stored transaction data by this update, this new information is further transmitted to the mobile end device 17.

Due to the previously described method for associating the received information in the information collection device 22 of the system 21 there is obtained the advantage that the information that may be displayed on the mobile end device 18 for the user regarding the transaction is always updated and correct. It would also be advantageous if the current information determined by the information collection device 22 may also be used by further devices, for example a loyalty system.

It is to be noted that also that information is to be understood in the course of the processing of the obtained and processed request information, output originally by the mobile device, by the processing devices as request information and, hence, may also be used for the best possible association by the information collection device.

It is further advantageous if the information collection device is constituted by a server which is permanently online and, hence, may permanently receive and process information from processing devices of the system. If a mobile device has issued its request by means of a local radio network (e.g., Bluetooth or RFID) and is not located within the local radio network immediately afterwards, then the current status information relating to the request and probable response will nevertheless be permanently updated in the information collection device. This updated information may then be collected by the mobile device via a data link at any point of time from the information collection device, or it may also be transmitted actively from the information collection device to the mobile device according to a further exemplary embodiment.

It is to be noted that a user could also issue a request using his/her mobile phone in the access control system 1 regarding the access to a room of the research instate 2 and pay for products in two shops using his/her mobile phone, the processing of which would be realized according to the system 21. The mobile phone would then permanently via the data link existing over the internet, acquire current information regarding these three transactions from the respective information collection devices and display these on the display. It is also possible that a user has several mobile end devices (e.g., one mobile phone, one tablet and one laptop), by means of which he/she may display the current information of requests or transactions, respectively.

The systems and methods described in the figures for performing a best possible association by means of a best effort matching algorithm may also be advantageously applied to other application examples than those described. There could be necessary, for example, with address books used in various devices, which are to be combined, the combination of this master data or a duplicate recognition. A user could have stored in his/her mobile phone the address and the birthday of a person and in his/her computer the phone number and the birthday of the same person. As the data sets in the address books of the mobile phone and of the computer have a different data set number, there is not given a clear association. By means of best effort matching, a best possible association and, hence, a combination of the two data sets known for this person may be realized by way of the matching of the name and the birthday in both data sets, which is advantageous.

The application of this best effort matching would also be possible in the determination of a concrete movement route if GPS data regarding a constant movement tracking as well as GPS data regarding possible routes (e.g., roads, in contrast to not usable paths) were available. The aim is to present the actually used route on the road instead of the GPS data from the movement tracking. As GPS data from movement tracking vary and are not always located on a particular route or road, respectively, there is required a best effort matching, which analyses the corresponding distance of the GPS data to the predefined routes or roads, respectively. In the case of an appropriate matching there is made the assumption that the user has actually used this road and that the route may be presented visually in a more realistic way on the map. In practice, the way to school of a child carrying a mobile phone may be tracked using a mobile phone of the parents. A route iD could constitute the request identification information, and the phone number or the identifier of the mobile phone of the child or of the parents, respectively, could constitute the identity identification information. The GPS data output by the child's mobile phone could be processed in a server constituting the final processing device, having access to the card data, and associated according to the best effort matching. The data of movement tracking, which are always up to date, of the way the child has actually taken could be requested by the parents' mobile phone by means of a request information of the information collection device. Further exemplary applications arise for those skilled in the art from these exemplary application examples.

The invention claimed is:

1. A system, comprising:
a POS (point of sale) terminal that is chip card-compatible;
a final processing server; and
an information collection server which is separate from the final processing server, and which is configured to communicate with a mobile device of a user;
wherein the mobile device and the POS terminal are different, and separate, entities;
and the system is operable to process a request, received by the system from the mobile device, using the POS terminal and the final processing server of the system,
wherein the mobile device is configured to process a request application for a payment transaction, by which a request information including a request identification information and a transaction status information, which comprises information indicating the progress of the processing of the request, are communicated between the mobile device and the POS terminal and are displayable on a display of the mobile device, and
wherein the POS terminal is operable to pre-process the request information and to transmit, directly or via further processing devices, pre-processed request information to the final processing server, and
wherein the final processing server is operable to store identity identification information identifying a user of the system and/or the mobile device,
wherein the information collection server is operable to associate the information received from the POS terminal, from the final processing server, or from the mobile device of the system, with a request of the mobile device in order to determine the current transaction status information of each request of each mobile device for which purpose there is carried out, in the case of the absence of the request identification information required for a clear association and/or identity identification information, a first association by way of the further pieces of information contained in the request information and that the information collection server is configured to transmit the current transaction status information of the request to the mobile device.

2. A system according to claim 1, wherein the information collection server continuously processes the information received by the POS terminal and the final processing server, or by the mobile device in a time-delayed and parallel way in order to maintain updated the determined current status information according to the actual processing status of the processing of the request information in the processing devices in the information collection server.

3. A system according to claim 1, wherein the information collection server in order to determine the first association of the request information received as information sources by the POS terminal and/or the final processing server, or by the mobile device in an intra-source association step is examined separate from one another and also examined together in an inter-source association step in order to determine the current status information of the request information by way of the results of the two association steps.

4. A system according to claim 1, wherein the information collection server, upon provision of the request identification information required for a clear association and/or identity identification information, is configured to correct the faulty association of the information received with the request of the mobile device which has been carried out in the course of the first association.

5. A system according to claim 1, wherein there is carried out using the system a payment transaction of the user of the system, wherein the final processing server comprises a card server of a card provider or issuer, respectively.

* * * * *